June 20, 1967  B. MICHAELS ETAL  3,326,482
AUTOMATIC REWIND MOTION PICTURE PROJECTOR
Filed Nov. 9, 1964  6 Sheets-Sheet 1

INVENTORS:
Bruno Michaels
Arthur E. Nupnau
BY Barry L. Clark
John E. Peele
ATTYS June 20, 1967  B. MICHAELS ETAL  3,326,482
AUTOMATIC REWIND MOTION PICTURE PROJECTOR
Filed Nov. 9, 1964  6 Sheets-Sheet 3

INVENTORS:
Bruno Michaels
Arthur E. Nupnau
BY Barry L. Clark
John E. Peele Jr.
ATTYS

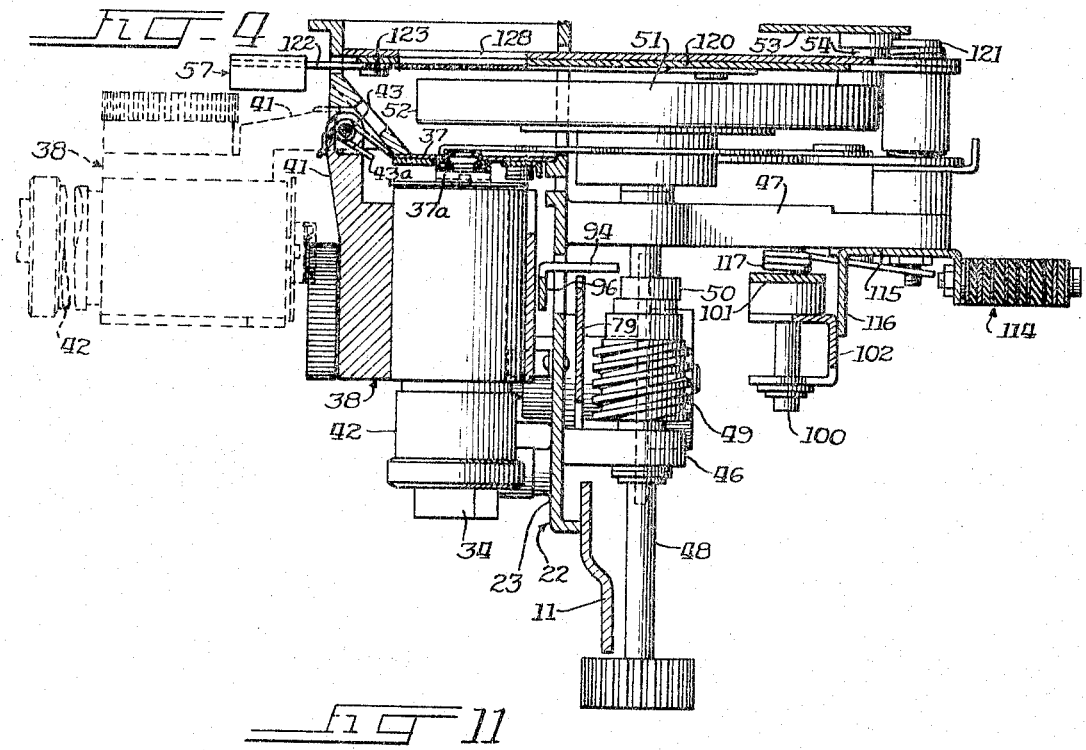
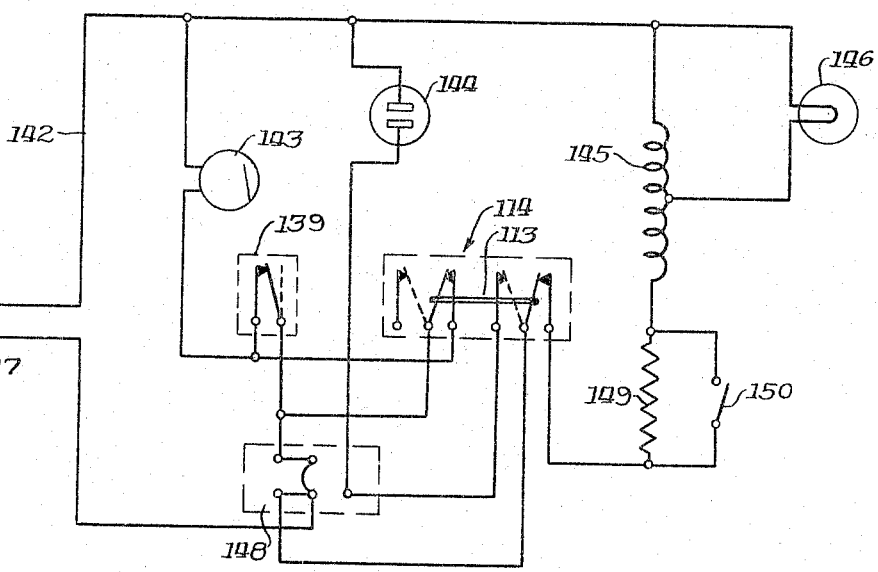

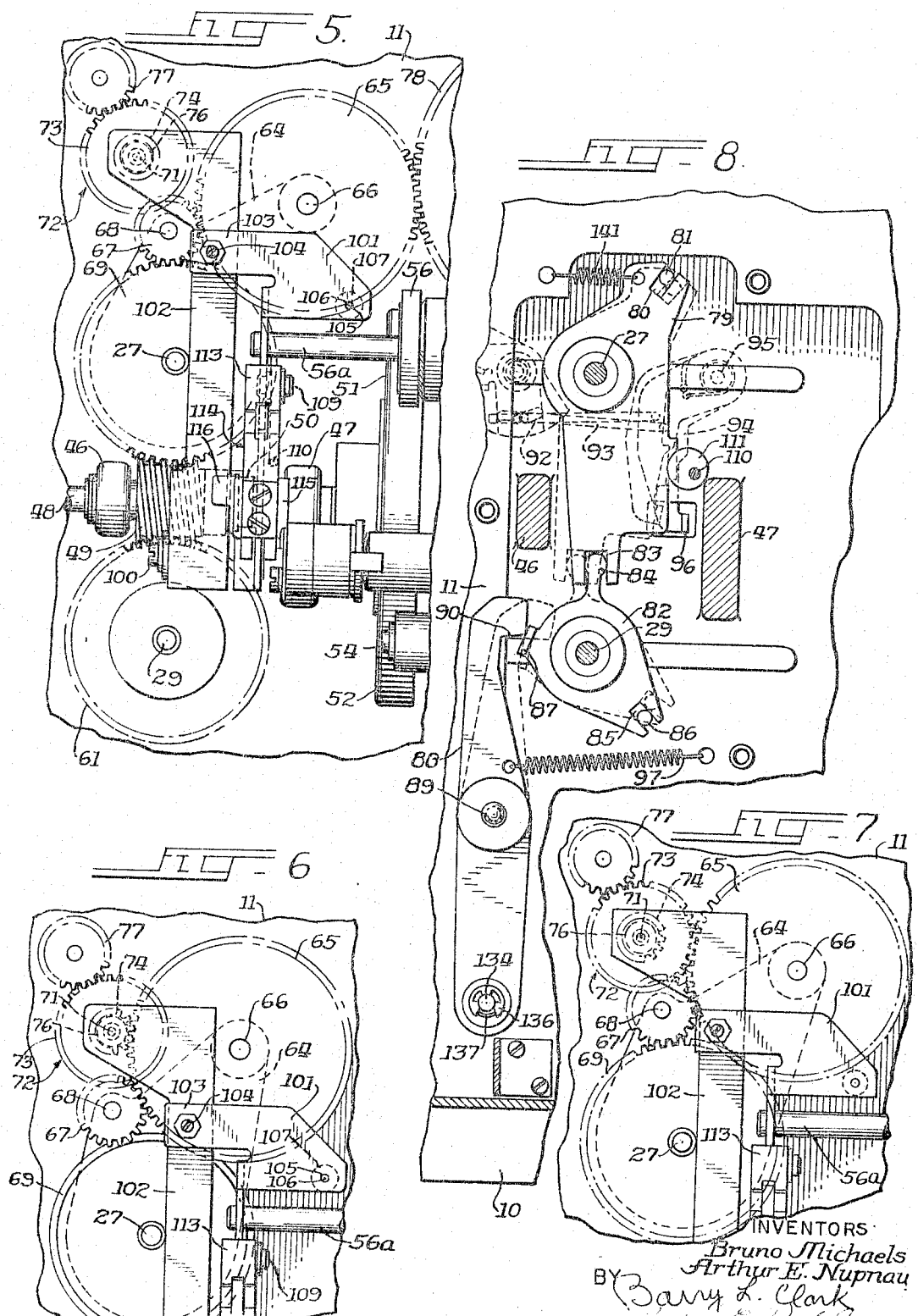

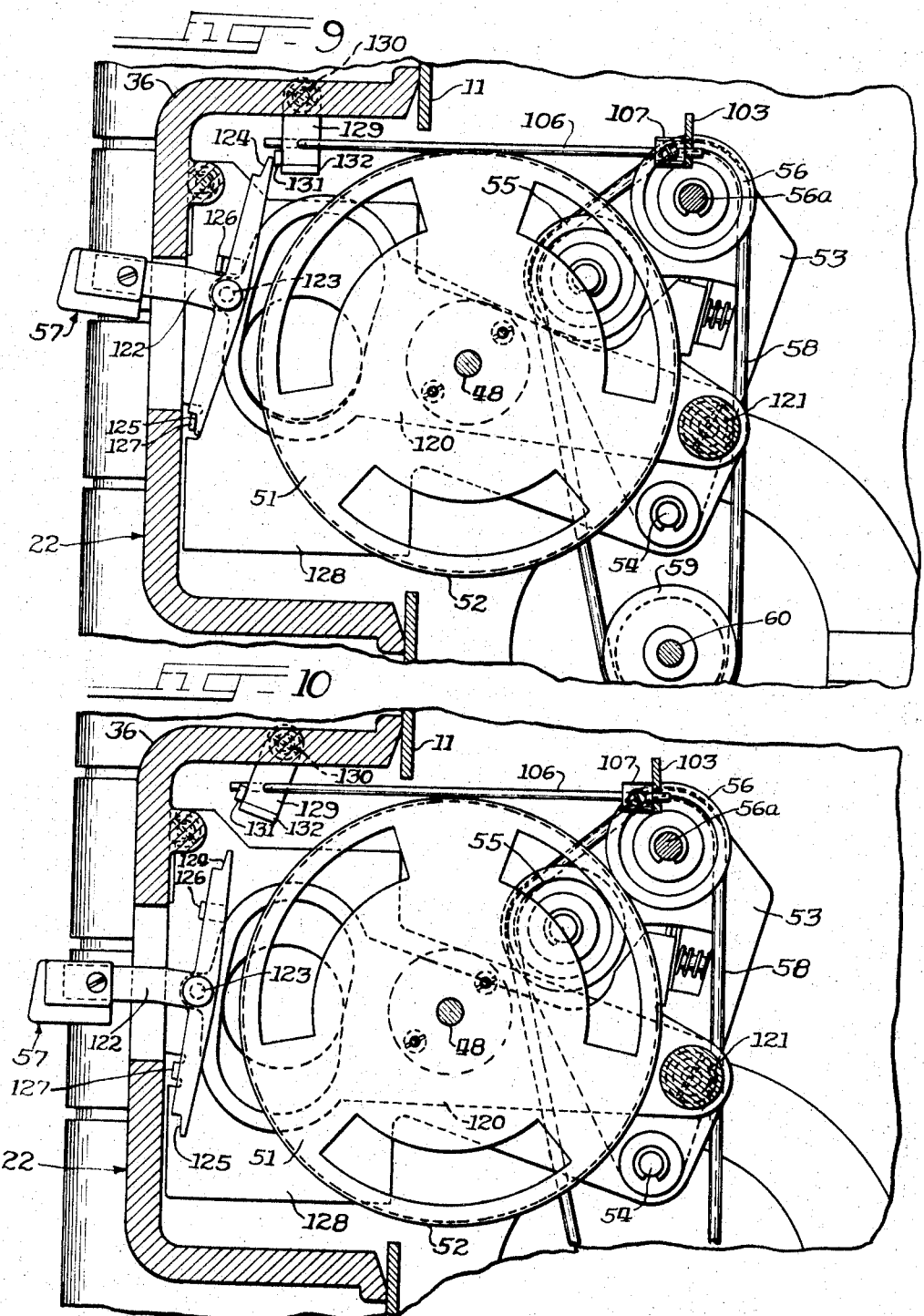

United States Patent Office 3,326,482
Patented June 20, 1967

3,326,482
AUTOMATIC REWIND MOTION PICTURE PROJECTOR
Bruno Michaels and Arthur E. Nupnau, Chicago, Ill., assignors to Bell & Howell Company, Chicago, Ill., a corporation of Illinois
Filed Nov. 9, 1964, Ser. No. 409,787
25 Claims. (Cl. 242—55.12)

This invention relates generally to improved strip film apparatus and more particularly to a motion picture film projector which automatically rewinds film onto a feed reel after the projection of such film has been completed.

It is an object of this invention to provide an improved motion picture projector which projects film at normal projection speeds and automatically rewinds film at a speed higher than such speeds.

Another object of this invention is to provide an improved motion picture projector which automatically removes a portion of the mechanism from the normal film path prior to automatic rewinding of the film at high speed.

Still another object of this invention is to provide a motion picture projector which, as an incident of high speed rewinding, restores the self-threading mechanism to self-threading position for projection of a subsequent film.

Yet another object of this invention is to provide a motion picture projector which automatically transfers control of the projector from a normal switch control to a film sensing switch control for automatically stopping the projector after a film has been completely rewound.

A further object of this invention is to provide a novel projector control which automatically de-energizes the projection lamp, to conserve lamp life, during the rewinding operation.

Other objects, advantages, and features will become apparent from the following description when read in connection with the accompanying drawings in which:

FIG. 4 is a cross sectional view taken on the line 4—4 of FIG. 2;

FIG. 5 is a rear elevational view of the projector with the cover removed;

FIG. 6 is a view similar to FIG. 5 showing parts in another functional position;

FIG. 7 is a view similar to FIG. 5 showing parts in yet another functional position;

FIG. 8 is a cross sectional view taken on the line 8—8 of FIG. 2;

FIG. 9 is a cross sectional view taken on the line 9—9 of FIG. 1;

FIG. 10 is a view similar to FIG. 9 showing parts in another functional position;

FIG. 11 is a circuit diagram showing the electrical controls of the projector.

Figure 1:
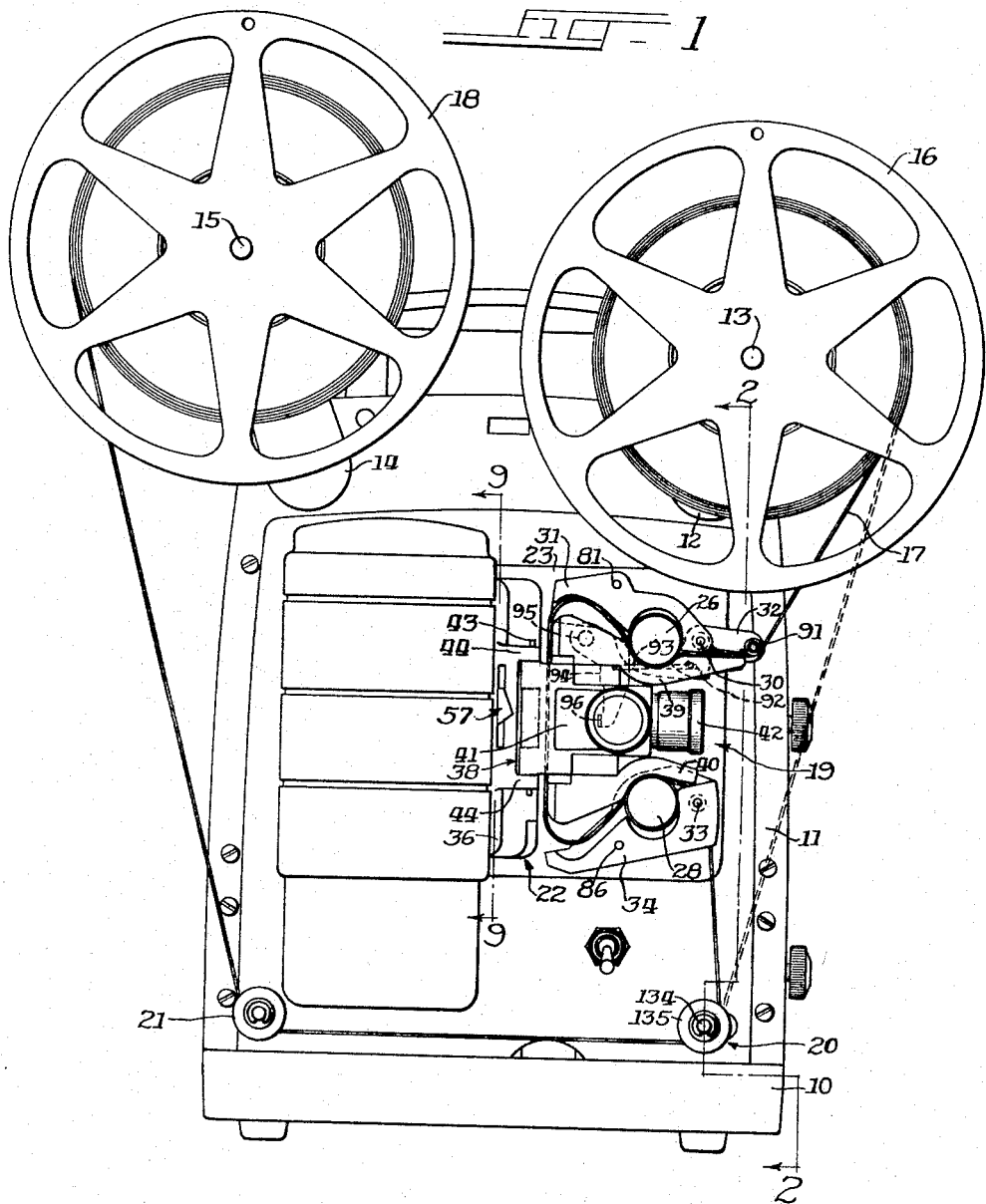
FIG. 1 is a front elevational view of a motion picture film projector showing the invention incorporated therein.

The improved projector comprises a base member 10 and perpendicular and affixed thereto a vertical plate member 11 both members serving to mount all of the projector mechanism. At the upper right of plate 11 a pivoted feed reel arm 12 carrying a feed reel spindle 13 is mounted. At the upper left of plate 11 a pivoted take-up reel arm 14 carrying a take-up reel spindle 15 is mounted. Feed reel 16 carrying a film 17 is mounted on the spindle 13 while a take-up reel 18 is mounted on the take-up spindle 15. Between these two reels the film travels through a film feeding mechanism generally designated at 19 and over a pair of rollers 20 and 21.

The film feeding mechanism 19 comprises an L-shaped casting 22 which is fastened to the plate member 11 and on the longer leg 23 of the casting 22 in suitable bearing supports 24 and 25 are rotatably mounted respectively film feed sprocket 26 on shaft 27 and film take-up sprocket 28 on shaft 29. Also mounted on leg 23 for pivotal movement on pivot 30 are upper loop forming member 31 and bell crank lever 32 and, for pivotal movement on pivot 33, lower loop forming member 34. In addition, a spring latch member 35 is mounted on leg 23. On the shorter leg 36 of casting 22 are mounted on aperture plate 37 and a hinged support structure generally designated at 38 comprising an upper film guide 39, a lower film guide 40, a spring urged pressure plate 37a, a lens support member 41 and a projection lens 42. The hinged support structure 38 is pivoted on a pin 43 mounted in ears 44 which are cast as part of leg 36. On the rear of lens support member 41 is a configuration 45 which snaps into and is held by the spring latch member 35, thus keeping the entire hinged structure latched in proper position for normal projection.

Casting 22 has two extending arms 46 and 47 projecting rearwardly from the leg 23 which serve to mount a drive shaft 48 as well as some of the controls which effect automatic rewinding of the film. On the main drive shaft 48 and affixed thereto are such items as a driving worm 49 with an eccentric 50, an up and down and an in and out cam for operating a film feed shuttle and a film shutter 51 having a driving rim 52.

A rocker plate 53 pivoted at 54 carries at its end opposite pivot 54 two driving pucks 55 and 56 which drive on either the inner or outer side of the shutter driving rim 52 to obtain forward or reverse drive of the film moving mechanism. A picture control lever indicated generally at 57 determines the position of the rocker plate 53. When the control lever 57 is in the position shown in FIG. 9, driving puck 55 is driving the inner periphery of the shutter driving rim 52 for forward projection. When control lever 57 is in its lowest position, driving puck 56 is engaged with the outer periphery of the shutter driving rim 52 for reverse projection. In the mid-position of the lever 57, neither puck is engaged and the projector can show a still picture. A yieldable belt 58 supplies driving power to the pucks from a pulley 59 affixed to a motor shaft 60.

Worm 49 (FIG. 2) meshes with gear 61 fastened to shaft 29 and thus drives the film take-up sprocket 28. It also drives gear 62 which is freely rotatable on upper feed sprocket shaft 27. A gear 63 is rotationally fixed with gear 62 and between the shoulders of these two gears a rocking plate 64 is mounted in frictional engagement with such shoulders so that it is urged in the direction in which the gears are rotating. Gear 63 meshes with a gear 65 mounted on a stud 66 affixed to the rocker plate 64. Gear 65 meshes with a gear 67 mounted on a stud 68 also affixed to the rocker plate 64. Gear 67 also meshes with gear 69 which is fastened to the upper feed sprocket shaft 27 and thus drives the upper film feed sprocket 26 in the same rotational direction as the lower take-up sprocket 28.

Riveted to a plate 70 is a stud 71 on which a compound gear indicated generally at 72 comprising gears 73 and 74 is rotatably and slidably mounted. Bearing against the side of gear 73 is a spiral compression spring 75 which urges the compound gear 72 to the right as viewed in FIGS. 2 and 3. Bearing against the side of gear 74 is a pusher member 76 which is also slidably mounted on stud 71. Gear 73 meshes with gear 77 which through a series of idler gears (not shown) drives the feed reel spindle 13 for reverse projection or for rewinding. Likewise a series of gears starting with a gear 78 is drivingly connected to the take-up spindle 15 for forward projection.

Mounted for pivotal movement about the axis of feed reel sprocket 26 is a lever 79 which has at one end a forked opening 80 engaging a pin 81 firmly affixed to and projecting rearwardly from upper movable loop former member 31 and at its other end an interconnection with another lever 82 pivoted about the axis of take-up sprocket 28 comprising a forked opening 83 on lever 79 and a generally circular configuration 84 formed on lever 82. Lever 82 also has a forked slot 85 which engages a pin 86 affixed to and projecting rearwardly from lower movable loop forming member 34. Lever 82 has a bent up ear 87 which forms part of a latch mechanism co-operating with a latch lever 88 pivoted at 89 and having a latch hook 90. At the other end of latch lever 88 roller 20 is mounted. Latch lever 88 is biased toward lever 82 by spring 97.

Bell crank lever 32 pivoted at 30 has mounted at the end of one of its arms a roller 91 and has a lost motion slot 92 formed in its other arm which forms part of a wire connection 93 between it and lever 94 pivoted at 95. Lever 94 has a bent up ear 96, the function of which will be described later.

Mounted to and projecting from arm 47 is a shaft 100 which serves as the pivot for levers 101 and 102. Lever 101 has formed at its upper end a right angle portion 103 which projects to the left as viewed in FIG. 5 in overlapping relationship with lever 102 and in the overlapping area has mounted to it an adjustable screw abutment which operates lever 102 when lever 101 is moved to the left as viewed in FIGS. 2 and 3.

Figure 2:
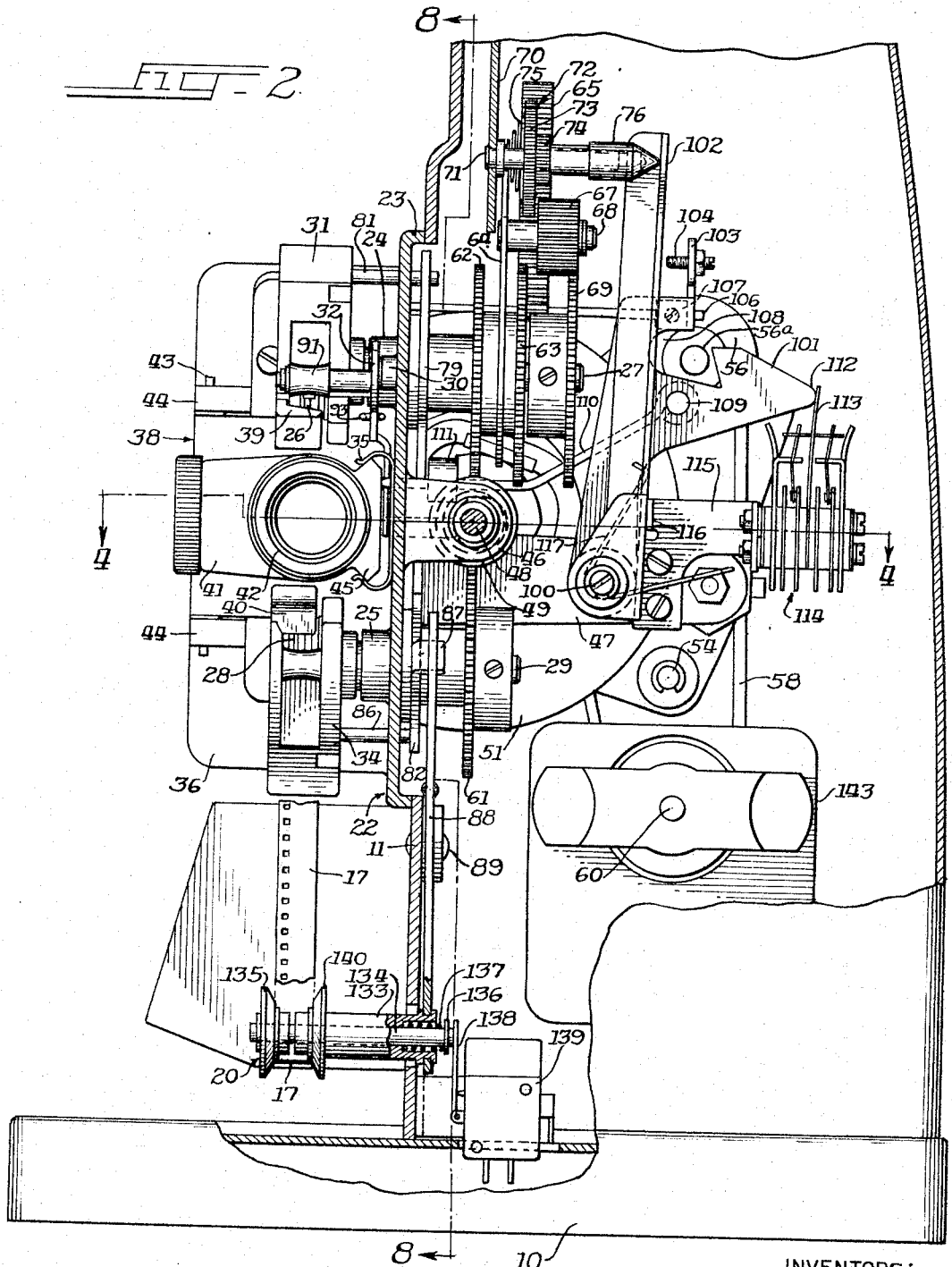
FIG. 2 is a cross sectional view taken on the line 2—2 of FIG. 1.
Figure 3:
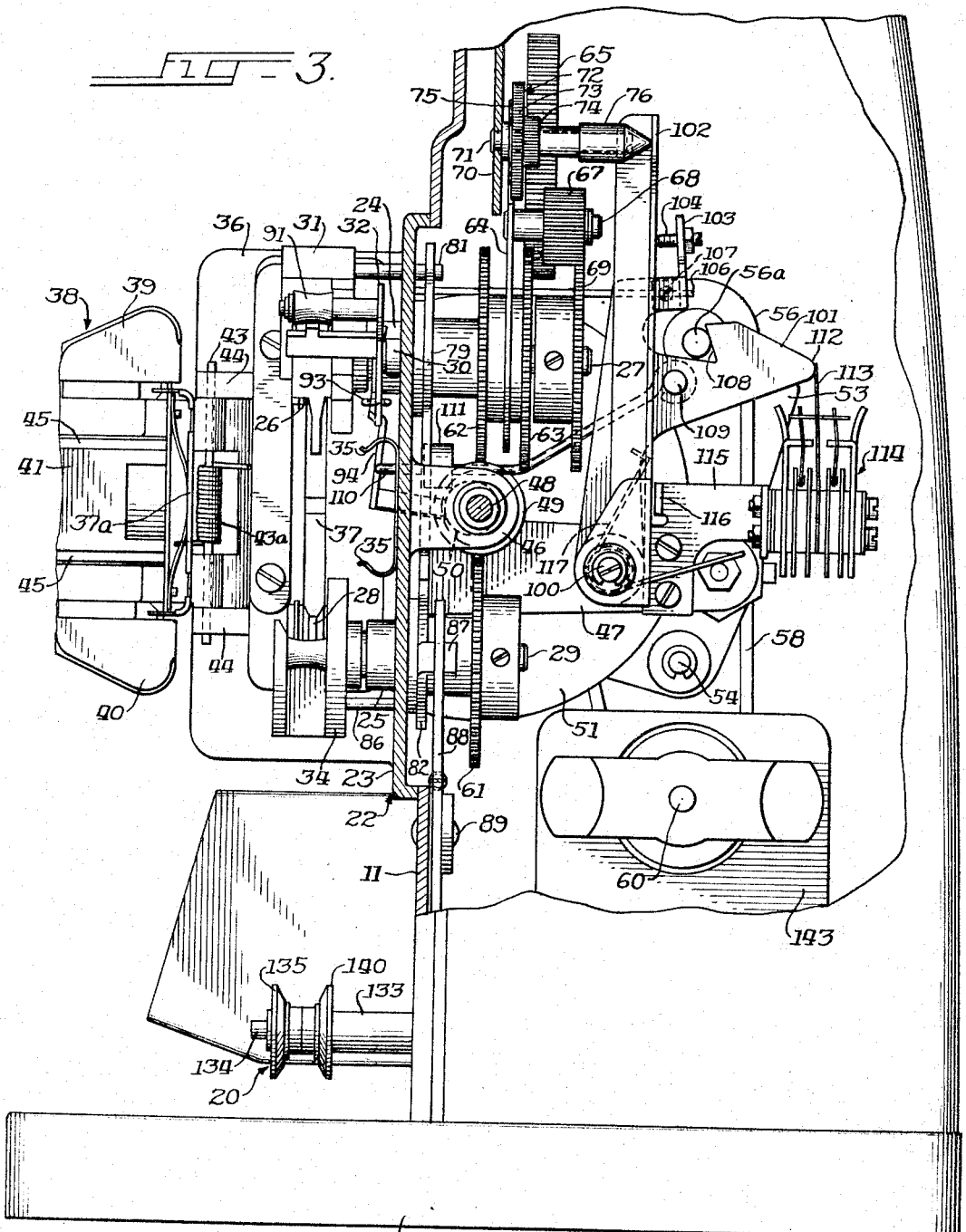
FIG. 3 is a cross sectional view similar to FIG. 2 showing parts in another functional position.

Right angle portion 103 also projects to the right as viewed in FIG. 5 and has a hole 105 through which a rod 106 having a set screw collar 107 projects. Lever 101 has an opening 108 into which shaft 56a projects, such shaft being the pivot for driving puck 56. Below opening 108 by means of a pin 109 a rod 110 is rotatably mounted to the arm 101. Rod 110 extends from the pin 109 through an adjustable eccentric set screw collar 111 and then through a hole in leg 23 of casting 22 finally abutting on configuration 45 of lens mount portion 41 of hinged support structure 38. Lever 101 also has an extension 112 which is in contact with the operating arm 113 of a switch indicated generally at 114 comprising two double pole-double throw electrical switch units. Switch 114 is mounted on a bracket 115 which is attached to arm 47 by screws. Bracket 115 has a bent up ear 116 which serves as the stop for lever 102 when it is in its right hand position as shown in FIG. 2. A hair pin type spring 117 urges lever 101 and 102 in a counter clockwise direction as shown in FIGS. 2 and 3.

Picture control member 57 comprises a member 120 mounted for pivotal movement on pivot 121 which is affixed to arm 47. At the left side of the lever 57 a T-shaped lever 122 is mounted for pivotal movement on pivot 123 which is affixed to member 120. T-shaped lever 122 has latch notches 124 and 125 formed at either end of its crossarm and arranged to co-operate respectively with latches 126 and 127 which are formed as bent up ears from a plate 128 affixed to leg 36 of casting 22. A latch release lever 129 pivoted at 130 on leg 36 of casting 22 has bent up ears 131 and 132 the function of which will be described later. Lever 129 also has a hole through which rod 106 is inserted and thus connected therewith.

As previously mentioned, roller 20 is mounted on one end of latch lever 88, such mounting comprising a tubular member 133 affixed to the end of lever 88 in which a shaft 134 is rotatably and slidably mounted. Shaft 134, at its outer end, has a flange 135 affixed to it and, at its inner end, has an E-ring 136 mounted against which a compression spring 137 surrounding the shaft 134 bears, the other end of spring 137 fitting an enlarged shouldered bore in the member 133. At its inner end, shaft 134 bears against an operating arm 138 of a normally open single pole-single throw switch 139. A flange 140 of roller 20 is rotatably mounted on shaft 134 and bears against the end of tubular member 133. If the film 17 is passing over roller 20 it separates the flange 135 from the flange 140 and thereby moves shaft 134 to the left as shown in FIG. 2, allowing switch operating arm 138 to move sufficiently to close the circuit under the control of switch 139. When there is no longer film between the roller flanges 135 and 140 switch 139 is opened and consequently opens the circuit which is under its control.

For proper operation of the projector it is necessary that the trailing end of the film 17 be positively attached to the hub of feed reel 16. No such attachment has been shown as it is obvious that this could be accomplished in many different ways such as by wedging the film into a slot in the reel. The leading end of the film 17 is inserted between the roller 91 and the upper fixed guide 39 from where it is engaged around the lower periphery of film feed sprocket 26. It then travels through the projection gate and then into engagement with the upper periphery of the film take-up sprocket 28. After leaving the sprocket 28, film 17 is placed around the rollers 20 and 21 and finally attached to the hub of take-up reel 18.

The take-up drive which drives spindle 15 causes sufficient tension on the film 17 to rotate the roller 20 mounted on the latch lever 88 and to pull lever 88 against biasing spring 97 to release latch hook 90 from latching gear 87 and thereby permits the upper loop forming member 31 and the lower loop forming member 34 to move to a non-loop forming position, as shown in FIG. 1, and in solid lines in FIG. 8. Such movement is effected by a tension spring 141 attached at one end to lever 79 and at its other end to mounting plate 11.

As the firmly attached trailing end of film 17 is reached, no further film can be withdrawn from the reel 16. This will cause a build up of tension on the film 17 between the feed reel hub and the upper film feed sprocket 26 which will now raise roller 91 attached to bell crank lever 32 and pivot lever 32 on pivot 30 in a counter clockwise direction as shown in FIG. 1 and in a clockwise direction as viewed in FIG. 8. Through the wire connection 93 between lever 32 and lever 94, lever 94 on its pivot 95 will be rotated in a clockwise direction placing bent up ear 96 in the path of eccentric 50 affixed to drive shaft 48. Eccentric 50 forces lever 94 to rock on its pivot 95 as shown in FIG. 3 and since lever 94 is located directly behind lens mounting portion 41, its rocking action forces configuration 45 out of latch spring 35 allowing the hinged support structure 38 to swing on its pivot pin 43 under the influence of a light torsion spring 43a (FIG. 4) to clear the normal film path.

As an incident of the clockwise movement of lever 94, the bent up ear 96 contacts the lower right edge of lever 79 as shown in FIG. 8 and moves this lever to the dotted line position shown in this figure. Movement of lever 79 puts both the upper loop former member 31 and the lower loop former member 34 back into self-threading position ready for the next showing.

Removal of configuration 45 from latch member 35 removes the abutting relationship between it and rod 110. Lever 101 which is attached to rod 110 through pivot 109 is now able to swing on its pivot 100 in a counter clockwise direction under the influence of hairpin spring 117 which starts a series of shifts of various parts of the projector to place it in its high speed rewinding mode of operation. Eccentric set screw collar 111 moves behind the right hand edge of lever 79 as viewed in FIG. 8 which locks the loop forming members in loop forimng positions so that the projector is placed in readiness for automatic threading of the next film after the rewinding operation has been completed. Opening 108 in lever 101 engages and moves shaft 56a to the left as shown in FIG. 3. Driving puck 56 pivoted on shaft 56a is brought into engagement with the outer surface of shutter driving rim 52 thus reversing the direction of drive shaft 48 which is necessary to rewind film.

As an incident of rotational movement of lever 101 rod 106 with its set screw collar 107 and its interconnection with the latch release lever 129 moves from the position shown in FIG. 9 to that shown in FIG. 10. Such movement causes bent up ear 131 to rotate T-shaped lever 122 about its pivot 123 until latch notch 125 is clear of latching ear 127 after which the picture control lever 57 snaps downwardly to the neutral position in which normally neither driving puck 55 nor driving puck 56 are in contact with the shutter driving rim 52. Should an operator accidentally move picture control lever 57 in an upward direction during the rewinding operation he would be prevented from latching this control lever in the upper or forward drive position of the projector by an interference between T-shaped lever 122 and bent up ear 132 formed as part of latch release lever 129. Any downward movement of picture control lever 57 would not damage the projector as driving puck 56 is already driving it in the reverse or rewinding direction which has been effected by lever 101.

Lever 101 through its screw abutment connection 104 moves lever 102 to the left as viewed in FIG. 3 and thus the compound gear 72, through pusher member 76, is moved against spiral tension spring 75 from the position shown in FIG. 2 to that shown in FIG. 3 to bring gear 74 into alignment with gear 65. Looking at FIG. 5, it will be seein that gear 65 is in engagement with gear 78 thus effecting take-up in the forward direction. However, since drive shaft 48 has been reverned in its drive direction the rotation of gears 62 and 63 has also been reversed and since rocker plate 64 is frictionally engaged by the shoulders of these two gears, this plate will be rotated in a counter clockwise direction as viewed in FIG. 5 until gear 65 meshes with gear 74.

Since gear 74 is part of compound gear 72, and gear 73 of compound gear 72 meshes with gear 77, feed spindle 13 is driven at a relatively high rotational speed in a counter clockwise direction as viewed in FIG. 1 for rewinding the film 17 from take-up reel 18 onto feed reel 16.

After the hingled support structure 38 is rotated out of the normal film path, film 17, upon reversal of the drive for rewinding, is pulled out of the area of the sprockets and projection gate to assume a path shown in dotted lines in FIG. 1.

FIG. 11 is a circuit diagram showing all of the electrical components and controls of the projector. An incoming electrical supply is indicated at 141 and one side of this supply 142 is connected to an electric drive motor 143, a room light receptacle 144, a voltage reducing transformer 145, and a low-voltage projection lamp 146. The other side 147 of the incoming supply 141 is connected with a switch 148 which in its off position is arranged to energize room light receptacle 144 by connecting supply 147 to it. In its second position, switch 148 connects supply 147 to the motor 143 and retains the connection to room light receptacle 144. In its third position, switch 148 retains the connection between supply 147 and the motor 143, breaks the connection between said supply and the room light receptacle 144, and also connects the supply 147 to the voltage reducing transformer 145. A resistor 149 can be used in connection with the voltage reducing transformer 145 to further reduce the voltage when top illumination of the lamp 146 is not required for projection of a particular film. If top illumination is either desired or required for a particular film, switch 150 can be closed which now connects supply 147 directly to the voltage reducing transformer 145.

Switch 148 is in its third position and switches 139 and 114 are in the positions shown in solid lines in FIG. 12 when the projector is in forward operation. Switch 114 is spring urged to the left as viewed in FIGS. 2 and 3 and in the direction of the arrow as viewed in FIG. 11. As lever 101 moves to the left from the position shown in FIG. 2 to that shown in FIG. 3 spring urged switch arm 113 bearing against the abutment 112 of lever 101 also moves to the left and assumes a position for the two switch units of switch 114 as shown in dotted lines in FIG. 11. In this switch position, the connection between supply 147 and the voltage reducing transformer 145 is broken by the right-hand switch unit thus extinguishing projection lamp 146 and at the same time making a connection between said supply and the room light receptacle 144. The left-hand switch unit of switch 114 transfers electrical control of the motor 143 from the rocker switch 148 to the roller sensing switch 139. As previously explained, the roller sensing switch remains in its circuit closing position only when film is between the flanges 135 and 140. When the last of the film 17 being rewound onto feed reel 16 from take-up reel 18 passes through the flanges, switch connection 139 will be broken and the motor 143 de-energized, thus stopping the projector.

It will be understood that modifications and variations may be effected without departing from the scope of the novel concepts of the present invention.

We claim as our invention:
1. In a film feeding mechanism,
film track forming means including outer film guiding parts and inner film guiding parts together forming a film track through which a film is advanced;
a lens structure on said inner parts through which images on the film are adapted to be projected;
means pivotally mounting said inner parts for movement to an open position to completely release the film from the film track for rewinding;
spring means biasing said inner parts to an open position;
other means latching said inner parts in operative association with said outer parts; and
means actuated by the film at the completion of a projection operation for positively releasing said latching means and accommodating movement of the inner parts to an open position by the bias of said spring means.

2. In a motion picture projector,
a base;
a support plate extending upwardly of said base;
an aperture plate having an aperture mounted on said support plate;
a supply reel rotatably mounted on said support plate for paying out a length of motion picture film;
at least one sprocket rotatably mounted on said support plate;
a support structure hinged to said support plate for movement toward said sprocket into closed position and away from said sprocket into an open position;
a film guide mounted on said support structure and adapted to cooperate with said sprocket to guide the film for threading on said sprocket when said hinged support structure is moved into a closed position;
a take-up reel for reeling up the projected film;
latch means latching said support structure into a closed position; and
release means for said latch means moving said support structure and film guide into an open position to completely release the film from the film track for rewinding.

3. In a motion picture projector,
a base;
a support plate extending upwardly of said base;
supply reel means for paying out a length of motion picture film, rotatably mounted on said plate;
at least one sprocket rotatably mounted on said plate;
a support structure hinged to said support plate for movement toward said sprocket into a closed position and away from said sprocket into an open position;

a film guide mounted on said support structure and adapted to cooperate with said sprocket to guide the film for threading on said sprocket when said hinged support structure is in its closed position;
take-up reel means for reeling up the projected film rotatably mounted on said support plate;
drive means for said sprocket, said supply reel means, and said take-up reel means;
the drive means for said supply reel means including change speed gearing shiftable to drive said supply reel means at a high rewinding speed upon movement of said support structure to an open position;
shifting means for shifting said change speed gearing biased to shift said change speed gearing to drive said supply reel at a high rewinding speed;
biasing means biasing said support structure to an open position to free the film for rewinding free from said sprocket and film guide;
latch means holding said support structure in its closed position and holding said shifting means from shifting said change speed gearing; and
release means for said latch means operated by tension on the film at the end of the reel;
whereby the film is released from said sprocket and said shifting means is released to shift said change speed to drive said supply reel means at a high rewinding speed at the termination of a projecting operation.

4. In a motion picture projector,
a base;
a support plate extending upwardly of said base;
a film feed sprocket and a vertically spaced film take-up sprocket rotatably mounted on said plate;
means for driving said sprockets;
a hinged support structure vertically pivoted on said plate for movement into a closed position in the space between said film feed and film take-up sprockets and into an open position out of the space between said film feed and film take-up sprockets;
upper and lower film guides mounted on said support structure and positioned to cooperate with said film feed and film take-up sprockets, to form a film track when said support structure is in a closed position;
spring means biasing said support structure into an open position to release the film from said film feed and film take-up sprockets;
a spring latch engageable with said support structure for holding said support structure in a closed position; and
release means for said latch operated by tension on the film at the termination of a projecting operation including means engageable with said hinged support structure, and power means moving said means in a direction to positively release said hinged support structure from said latch and thereby release the film from said sprockets.

5. In a motion picture projector,
a base;
a support plate extending upwardly of said base;
a film feed sprocket on said support plate;
a vertically spaced film take-up sprocket on said support plate;
a hinged support structure vertically pivoted to said plate for movement into a closed position in the space between said film feed and take-up sprockets and into an open position free from said film feed and take-up sprockets;
spring means biasing said support structure into an open position;
upper and lower film guides on said support structure cooperating with said film feed and take-up sprockets to form a film track when said hinged support is in the space between said sprockets;
a tension idler spaced from the incoming side of said film feed sprocket and adapted to have the film trained thereunder as it passes to said film feed sprocket;
movable mounting means for said tension idler;
drive means driving said film feed and film take-up sprockets;
a cam driven by said drive means;
releasable latch means retaining said support structure in the space between said film feed and film take-up sprockets;
a release member movably mounted on said support structure and moved by movement of said movable mounting means by tension of the film on said tension idler, into the path of said cam, to effect the release of said hinged support structure and movement of said support structure into an open position to release the film, at the termination of a projecting operation.

6. In a motion picture projector,
a base;
a support plate extending upwardly of said base;
a film feed reel spindle and a film take-up reel spindle mounted on said support plate;
a film feed reel and a film take-up reel mounted on respective of said spindles;
a film feeding mechanism mounted on said support plate between said reels;
means driving said film feeding mechanism;
other means driven by said means for driving said film feeding mechanism for driving said film feed reel spindle and said film take-up reel spindle;
said means driving said film feed reel spindle including change speed gears driving said film feed reel spindle in a reverse direction for reverse projection and also driving said film feed reel spindle in a reverse direction at a high rewinding speed;
a hinged support structure vertically pivoted on said plate;
film guides mounted on said hinged support structure for cooperation with said film feeding mechanism to form a film track;
latch means holding said film guides in operative association with said film feeding mechanism; and
means operated by tension on the film at the end of the feed reel, for releasing said latch means, to release the film from said film feeding mechanism and shifting said gearing to drive said feed reel at a high rewinding speed.

7. In a motion picture projector,
a base;
a support plate extending upwardly of said base;
a film feed reel spindle and a film take-up reel spindle mounted on said support plate at the upper end thereof;
a film feed reel and a film take-up reel mounted on respective of said spindles;
geared drive connections to said reels;
the geared drive connection to said film feed reel including change speed gearing shiftable to drive said feed reel at a high rewinding speed;
means for shifting said gearing;
film feeding mechanism mounted on said support plate beneath said reels;
means guiding the film from said film feed reel to said film feeding mechanism including an idler at the incoming side of said film feeding mechanism;
an idler arm pivoted on said support and forming a support for said idler;
the film being adapted to be trained under said idler to said film feeding mechanism;
spaced idlers spaced from said film feeding mechanism at the outgoing side thereof and training the film to said film take-up reel;
a hinged support structure vertically pivoted to said support plate for movement into a closed position in juxtaposition to said film feeding mechanism;

film guides mounted on said hinged support structure and cooperating with said film feeding mechanism to form a film track when said hinged support structure is in a closed position;

spring means biasing said support structure and film guides into an open position out of cooperative association with said film feeding mechanism;

yieldable latch means holding said support structure and film guides in a closed position in operative association with said film feeding mechanism; and means operated by tension on the film reacting against said idler and idler arm at the termination of a projecting operation and pivoting said idler arm to effect the release of said hinged support structure from said latch means and the movement of said support structure and film guides into an open position, to release the film from said film feeding mechanism and effect training of the film from said film feed to said film take-up reel about said spaced idlers at the outgoing side of said film feeding mechanism, and also operating said means for shifting said gearing to effect a drive to said film feed reel through said change speed gears at a high rewinding speed.

8. In a motion picture projector,
a base;
a support plate extending upwardly of said base;
a film feed reel spindle rotatably supported on said plate;
a film take-up reel spindle rotatably supported on said plate in spaced relation with respect to said film feed reel spindle;
film feed and take-up reels mounted on said respective spindles;
film feeding mechanism mounted on said plate and including vertically spaced film feed and film take-up sprockets;
a main drive shaft;
drive connections from said shaft for driving said film feed and film take-up sprockets and said film feed and take-up reels;
a hinged support structure vertically pivoted on said plate;
film guides mounted on said hinged support structure for cooperation with said sprockets to form a film track;
a latch holding said support structure and film guides in a closed position in operative association with said film feed and film take-up sprockets;
a spring biasing said support structure into an open position out of operative association with said latch; and
release means for said latch including a release lever pivoted on said support plate and having release engagement with said support structure;
a cam on said drive shaft;
an idler arm pivotally mounted on said support plate;
an idler on the end of said arm having the film trained from said film feed reel under said idler to said feed sprocket; and
an operative connection from said idler arm to said release lever for moving said release lever into the path of said cam to effect movement of said release lever by said cam to release said support structure from said latch; and accommodate said spring to move said support structure and film guides into an open position out of operative association with said film feed and film take-up sprockets, to release the film from said sprockets and accommodate the film to bypass said sprockets and be wound by reverse rotation of said film feed spindle.

9. A motion picture projector in accordance with claim 8 wherein:
the drive connection between the main drive shaft and the film feed reel includes change speed gearing for rotating said film feed reel in a winding direction at a reverse projection speed when said spring latch with said hinged support structure is closed and said spring latch is engaged therewith, and means for shifting said gearing to drive said film feed reel at a high rewinding speed upon release of said latch and movement of said hinged support structure into an open position.

10. A motion picture projector in accordance with claim 9 wherein:
said means for shifting includes a member biased to move in a direction to shift said change speed gearing to effect a drive to said feed reel at a high rewinding speed;
said member being normally held against its bias by said release lever and released to its biased position when said release lever is released.

11. A motion picture projector in accordance with claim 10 and further including:
a reversible drive mechanism for driving said main drive shaft in reverse directions;
said reversible drive mechanism being actuated by said member when said member is released.

12. In a motion picture projector;
a base;
a support plate extending upwardly of said base;
a film feed reel spindle and a film take-up reel spindle journalled on said support plate;
film feed and take-up reels mounted on said spindles;
a film feed sprocket and a film take-up sprocket spaced beneath said spindles and journalled on said support plate;
upper and lower loop formers movably mounted on said support plate for cooperation with said sprockets;
a pair of spaced idlers spaced beneath said film feed and take-up sprockets on the outgoing side of said take-up sprocket;
a latching lever forming a movable mounting for one of said idlers;
a main drive shaft journalled in said support plate;
drive connections from said shaft for driving said spindles and sprockets;
the drive connection to said film feed reel spindle including change speed gearing, for driving said spindle at a high rewinding speed at the termination of a projecting operation;
a hinged support structure vertically pivoted on said plate for movement into open and closed positions into and out of the space between said film feed and film take-up sprockets;
film guides mounted on said hinged support structure and cooperating with said film feed and take-up sprockets and said upper and lower loop formers to form a film track when said hinged support structure is in a closed position;
yieldable latch means retaining said support structure and film guides in closed positions;
lever means pivotally mounted on said support plate;
slidable and pivotal connections between said lever means and said upper and lower loop formers for moving said loop formers into closed self-threading positions;
spring means biasing said lever means to hold said loop formers in open positions;
spring means biasing said latching lever into position to latch said lever means and loop formers in closed self-threading positions;
said latching lever being moved by tension on the film reacting against said idler mounted thereon during a projecting operation to release said latch means and accommodate said loop formers to move into open positions; and
means operated by tension on the film at the incoming side of said feed sprocket, at the termination of a projecting operation, for releasing said spring latch and accommodating said hinged support structure and film guides to pivot out of operative association with said film feed and film take-up sprockets and release the film therefrom, and to reset said lever means to be latched by said latching lever and hold said loop formers into closed self-threading positions.

13. A motion picture projector in accordance with claim 12 wherein said tension operated means comprises:

an idler arm pivoted on said support plate adjacent said film feed sprocket;

an idler mounted on the end of said arm, said arm and idler being biased into, and adapted to train film thereunder passing from said film feed reel to said film feed sprocket;

a release lever; a cam is mounted on said drive shaft and continuously driven therefrom;

due to said release lever being actuated by movement of said idler arm tension on the film at the end of the reel to move into the path of said cam to effect a positive release of said hinged support structure from said latch means and movement of said support structure and film guides into open positions, to release the film.

14. In a motion picture projector, a base;

a support plate extending upwardly of said base;

a film feed reel spindle and a film take-up reel spindle journalled on said support plate;

film feed and take-up reels mounted on said spindles;

a film feed sprocket and a film take-up sprocket spaced beneath said spindles and journalled on said support plate;

upper and lower loop formers movably mounted on said support plate for cooperation with said sprockets;

a pair of spaced idlers spaced beneath said film feed and take-up sprockets on the outgoing side of said take-up sprocket;

a latching lever forming a movable mounting for one of said idlers;

a main drive shaft journalled in said support plate;

an electrically energizable motor for driving said shaft;

drive connections from said shaft for driving said spindles and sprockets;

the drive connection to said film feed reel spindle including change speed gearing, for driving said spindle at a high rewinding speed at the termination of a projecting operation;

a hinged support structure vertically pivoted on said plate for movement into open and closed positions into and out of the space between said film feed and film take-up sprockets;

film guides mounted on said hinged support structure and cooperating with said film feed and take-up sprockets and said upper and lower loop formers to form a film track when said hinged support structure is in a closed position;

yieldable latch means retaining said support structure and film guides in closed positions;

lever means pivotally mounted on said support plate;

slidable and pivotal connections between said lever means and said upper and lower loop formers for moving said loop formers into closed self-threading positions;

spring means biasing said lever means to hold said loop formers in open positions;

spring means biasing said latching lever into position to latch said lever means and loop formers in closed self-threading positions;

said latching lever being moved by tension on the film reacting against said idler mounted thereon during a projecting operation to release said lever means and accommodate said loop formers to move into open positions;

switch means for controlling the energization of said motor;

means sensing the presence of film on said idler on said latching lever and effecting the closing of said switch to energize said motor by the presence of film on said idler and effecting the opening of said switch upon the lack of film on said idler.

15. In a motion picture projector, a base;

a support plate extending upwardly of said base;

a film feed reel spindle and a film take-up reel spindle journalled on said support plate;

film feed and take-up reels mounted on said spindles;

a film feed sprocket and a film take-up sprocket spaced beneath said spindles and journalled on said support plate;

upper and lower loop formers movably mounted on said support plate for cooperation with said sprockets;

a pair of spaced idlers spaced beneath said film feed and take-up sprockets on the outgoing side of said take-up sprocket;

a latching lever forming a movable mounting for one of said idlers;

a main drive shaft journalled in said support plate;

an electrically energizable motor for driving said shaft;

drive connections from said shaft for driving said spindles and sprockets;

the drive connection to said film feed reel spindle including change speed gearing, for driving said spindle at a high rewinding speed at the termination of a projecting operation;

a hinged support structure vertically pivoted on said plate for movement into open and closed positions into and out of the space between said film feed and film take-up sprockets;

film guides mounted on said hinged support structure and cooperating with said film feed and take-up sprockets and said upper and lower loop formers to form a film track when said hinged support structure is in a closed position;

yieldable latch means retaining said support structure and film guides in closed positions;

lever means pivotally mounted on said support plate;

slidable and pivotal connections between said lever means and said upper and lower loop formers for moving said loop formers into closed self-threading positions;

spring means biasing said lever means to hold said loop formers in open positions;

spring means biasing said latching lever into position to latch said lever means and loop formers in closed self-threading positions;

said latching lever being moved by tension on the film reacting against said idler mounted thereon during a projecting operation to release said lever means and accommodate said loop formers to move into open positions;

said idler on said latching lever having a part held from axial movement and an axially movable part between which the film is trained;

spring means biasing said parts toward each other;

switch means controlling the energization of said motor; and a connection between said axially movable part of said idler and said switch means, for opening said switch means when said parts are together; and said parts being moved apart by the presence of the film passing about said idler and moving said connection to effect closing of said switch means and controlling said motor upon the training of film about said idler.

16. An apparatus for projecting and rewinding motion picture film in accordance with claim 2 and further including:

power means including change speed gearing for selectively driving the supply reel; and
means for shifting said change speed gearing to drive said supply reel at a high rewinding speed, upon operation of said release means.

17. A motion picture projector in accordance with claim 2 wherein said film release means includes:
an arm and a film guiding member mounted on the arm for limited movement on said support plate and normally biased into the path of a film passing from the supply reel to said at least one sprocket;
a release member mounted for limited movement on said support plate for releasing said latch means;
means for biasing said support structure and film guide into an open position; and
means actuated by movement of said arm when said arm and guiding member are moved against their bias by a tautness in the film at the end of a projection operation for actuating said release member to release said latch means.

18. A motion picture projector in accordance with 17 and further including:
a continuously rotating shaft for driving said sprocket; said means actuated by movement of said arm including a release cam on said shaft and rotatably driven thereby; said release member being moved into alignment with said cam by said arm by a tautness in the film at the termination of a projecting operation.

19. A motion picture projector in accordance with claim 3 wherein:
a film guiding member is movably mounted in the path of film passing from the supply means to the sprocket, the film being trained under said film guiding member; said release means including a release lever to release said latch; and
an operative connection between said film guiding member and said release lever to move said lever into position to effect the release of said latch when said film guiding member is moved by tension in the film at the termination of a projecting operation.

20. The method of projecting and automatically rewinding moving picture film which comprises the steps of:
threading the outer end of a moving picture film wound on a supply member through a film track having inner and outer guiding portions;
advancing the film during a projection operation through a film gate having inner and outer film engaging members;
projecting the film through a lens to which said inner film engaging member is attached;
sensing the film substantially at the completion of a projection operation and before all of the film has been removed from the supply member;
moving said inner guiding portions and said lens and inner film engaging member completely out of the path of said film after said film has been sensed; and
driving said supply reel in a rewinding direction to move a portion of the film out of the film gate area, through the area occupied by the lens during projection, and onto the supply reel.

21. In a motion picture projector including a supply means, automatic loop forming means having closed and open positions for threading and projecting means for biasing the loop forming means to its open position, and means for latching the loop forming means in its closed position against said biasing means,
the improvement comprising:
movable film guiding means for guiding film between said supply means and said automatic loop forming means,
linkage means connecting said movable film guiding means to said loop forming means, said linkage means being operable to move said loop forming means to its latched closed position when said movable film guiding means is moved due to an increase in the tension in the film passing between the supply means and loop forming means at the completion of a projection operation.

22. The projector of claim 21 and further comprising:
drive means for selectively driving the supply means at a high rewinding speed, said drive means being actuated by said linkage means to cause the supply means to be driven at said high rewinding speed simultaneously with the movement of the loop forming means to a closed latched position due to an increase in the tension in the film at the completion of a projection operation.

23. In a film feeding mechanism,
film track forming means including outer film guiding parts and inner film guiding parts together forming a film track through which a film is advanced;
said outer film guiding parts being attached to a motion picture projector;
said inner film guiding parts being attached to gate means;
said gate means being pivotally attached to the motion picture projection for movement relative thereto;
said gate means further having attached thereto a pressure plate, a lens support member and a projection lens through which images on the film are adapted to be projected;
said gate means being pivotally movable away from said motion picture projector whereby to move said inner film guiding parts from cooperative relationship with said outer film guiding parts, to release the film from the film track.

24. An apparatus for projecting and rewinding motion picture film comprising:
supply reel means for paying out a length of motion picture film;
film track means including inner and outer relatively separable parts separable from a closed position to form a film track between the parts along which the film travels during a projecting operation, to an open position to free the film for rewinding;
take-up reel means for reeling up the projected film;
means movably supporting one of said parts and accommodating automatic separation of the parts following projection of the film, but without disconnecting the film from the supply reel means; and
latch means for holding the parts in closed positions, and release means actuated by the film at the incoming side of said film track means, as the film reaches the end of its reel for effecting release of the latch means;
whereby the film will automatically move completely out of the track formed by said inner and outer relatively separable parts to a rewinding position between the supply and take-up reels.

25. An apparatus for projecting and rewinding motion picture film comprising:
supply reel means for paying out a length of motion picture film;
film track means including inner and outer relatively separable parts separable from a closed opsition to form a film track between the parts along which the film travels during a projecting operation, to an open position to free the film for rewinding;
take-up reel means for reeling up the projected film;
means movably supporting one of said parts and accommodating automatic separation of the parts following projection of the film, but without disconnecting the film from the supply reel means;
spring means for biasing the parts into separated positions;
latch means for holding the parts in closed position; and release means for releasing the latch means operated by tension on the film at the end of a projecting operation;

whereby the inner and outer relatively separable parts will separate by the bias of the spring means, and release the film for automatic movement completely out of the film track formed by said parts to a rewinding position between the supply and take-up reels free from the film track.

References Cited

UNITED STATES PATENTS

| | | | |
|---|---|---|---|
| 2,935,271 | 5/1960 | Vivie | 242—55.11 |
| 3,149,797 | 9/1964 | Pastor et al. | 242—55.13 |
| 3,185,401 | 5/1965 | Hardy | 242—55.13 |

LEONARD D. CHRISTIAN, *Primary Examiner.*

FRANK J. COHEN, *Examiner.*